US008432255B2

(12) United States Patent
Landt et al.

(10) Patent No.: US 8,432,255 B2
(45) Date of Patent: Apr. 30, 2013

(54) SECONDARY DATA CHANNELS IN RFID SYSTEMS

(75) Inventors: Jeremy Landt, Santa Fe, NM (US); Michael George Melville, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 779 days.

(21) Appl. No.: 12/421,510

(22) Filed: Apr. 9, 2009

(65) Prior Publication Data

US 2010/0259363 A1 Oct. 14, 2010

(51) Int. Cl.
G08C 19/22 (2006.01)
G08C 19/24 (2006.01)
H03K 7/08 (2006.01)

(52) U.S. Cl.
USPC ..... 340/10.1; 340/10.4; 340/10.41; 340/11.1; 340/12.17; 375/238

(58) Field of Classification Search ............. 340/870.24, 340/538.11, 10.4–10.41, 11.1, 12.17, 13.27–13.3; 375/238

See application file for complete search history.

(56) References Cited

U.S. PATENT DOCUMENTS

| | | | | |
|---|---|---|---|---|
| 3,609,728 | A | * | 9/1971 | Quinn et al. ............ 340/870.17 |
| 4,075,632 | A | | 2/1978 | Baldwin et al. |
| 4,373,154 | A | * | 2/1983 | Balme et al. .................... 341/58 |
| 5,987,068 | A | * | 11/1999 | Cassia et al. ................. 375/281 |
| 7,215,713 | B2 | * | 5/2007 | Walker et al. ................. 375/261 |
| 7,260,159 | B2 | * | 8/2007 | Lee et al. ...................... 375/329 |
| 2005/0280509 | A1 | * | 12/2005 | Tanaka et al. ................ 340/10.3 |

OTHER PUBLICATIONS

Google Definitions for Perturbation,Jul. 28, 2012, https://www.google.com/search?q=define%3A+perturbation&sourceid=ie7&rls=com.microsoft:en-us:IE-SearchBox&ie=&oe=#hl=en&rls=com.microsoft:en-us:IE-SearchBox&q=perturbation&tbs=dfn:1&tbo=u&sa=X&ei=084TUlimIdHF0AG-rYCYCQ&ved=0CFgQkQ-4&bav=on.2,or.r_gc.r_pw.r_qf.,cf.osb&fp=c0673595212d1c3b&biw=1846&bih=914.*

* cited by examiner

*Primary Examiner* — Daniel Wu
*Assistant Examiner* — John Bamert
(74) *Attorney, Agent, or Firm* — Caesar, Rivise, Bernstein, Cohen & Pokotilow, Ltd.

(57) ABSTRACT

One or more secondary data channels are added to existing RFID protocols within the existing bandwidth, data clock rate and message frame times of the protocols.
An RFID system is described having at least one reader and at least one tag includes communication between the reader and the tag using a radio frequency carrier signal modulated by a modulation signal to provide a modulated carrier signal conveying digital data in either direction. The modulation signal includes a first encoded modulation signal perturbed by encoded perturbations, the first encoded modulation signal being produced from a first data string. The encoded perturbations are produced from a second data string. The modulation signal modulates the radio frequency signals to transfer data representative of the first and second data strings simultaneously between the reader and the tag. The modulation signal modulates the amplitude, phase, frequency or any combination of the radio frequency carrier signals.

22 Claims, 5 Drawing Sheets

Fig. 1. Manchester and FM0 Coding - Edge Shift Encoding of Secondary Data

SECONDARY DATA CHANNELS IN RFID SYSTEMS

BACKGROUND OF THE INVENTION

1. Field of Invention

This invention relates to the field of data communication and, in particular, the field of RFID data communication.

2. Description of Related Art

RFID is an acronym for radio frequency identification. RFID is a term used for a variety of communication systems using radio frequencies from about 100 kHz to over 6 GHz. RFID systems are characterized by relatively simple devices (often referred to as tags, transponders, tokens etc.) deployed in large numbers that communicate digital information with relatively fewer and more complex devices (often called readers, interrogators, scanners, etc.). Tags are affixed to objects or places to be identified, monitored and tracked. Readers obtain digital information from tags and often send digital information to tags for storage and control. Readers interface to external data systems such as host computers. Data transfer between tags and readers can be one-way (read only tags) or two-way (read write tags). Radio technologies include inductive (or sometimes capacitive) coupling at low frequencies. Readers using propagating electromagnetic waves send data to tags by modulation of transmitted radio signals. Since the tags are usually relatively simple, various forms of amplitude modulation are used since amplitude modulation is relatively simple for the tag to recover using direct detection techniques with a diode rectifier or equivalent. Tags can send data to readers using modulated backscatter or active radio transmission. Tags can use batteries for power or alternatively, use energy harvesting techniques such as rectification of RF signals, conversion of visible or infra red light using photocells and the like.

RFID systems have become popular for applications in item management, warehousing, logistics, the supply chain, factory automation, electronic toll collection, wireless access control, security, wireless passes for ski lifts, busses and subways, tracking rail cars, intermodal containers, trucks, identification of animals and many other such applications.

A given RFID system uses one of a variety of communication protocols, some proprietary and others based on ad hoc or formal national and international standards. RFID systems are widely deployed. As applications have grown and capabilities have increased, compatibility between systems and with system upgrades has become a problem. It is common to attach several tags, each using a different protocol, to an object to enable that object to interface with RFID readers of different protocols. One example is for interstate trucks that routinely pass through ports of entry, use toll roads and cross bridges each using an RFID system of a differing protocol. It is also common for reader stations to use several readers of different protocols, or single readers implementing several protocols to be able to interface with tags of different protocols. Such systems may experience a reduced throughput due to the necessity of processing differing protocols in series.

Tags using differing protocols can overlap service areas due to expansion of neighboring systems using products produced to different protocols. Differing protocols can also exist in a region due to upgrades of capability and thus new or expanded capability protocols. The use of multiple protocol tags and multiple protocol readers can ease the transition to new systems without requiring a mass recall and replacement of tags, which is a time consuming and expensive process.

As usage increases, it is often desirable to expand the capabilities of an RFID system that is already in place. Enhancements and updates may include faster data rates, changing the coding, adding command codes, increasing memory size, adding authentication and/or encryption or modifying other such details of the communication protocol. To make use of an updated tag, an updated reader is required. If a complete tag replacement is to be avoided due to concerns of cost and service disruption, the capability to read existing tags must be retained. Thus, the updated reader must manage two populations of tags. Likewise, if the tags using a new protocol are to be introduced before readers using the new protocol, the new tags must also respond to old readers. Tags, readers, communications protocols and methods of use must be carefully designed to minimize interference and maintain the desired throughput.

Some companies have done well implementing multiple protocols within a system. For example, TransCore™ RFID systems for electronic toll collection include protocols from ISO 10374, ATA, AAR, ISO 18000-6B, Title 21 of the state of California, and extensions of these standards. These protocols include read-only as well as read-write tags. Some installations have started with the ISO10374/ATA/AAR protocol, migrated to Title 21, and then to ISO 18000-6b. These protocols are quite different from each other and careful equipment design, manufacture, configuration and installation are needed for successful implementation including enforcement (catching vehicles evading paying the toll). Performance requirements of an electronic toll collection system are demanding. The available time and frequency spectrum must be carefully managed and used by the RFID system to achieve the high reliability demanded by toll operations while remaining within radio regulations. Adding an additional service, such as authentication of tags to increase security and reduce fraud, requires additional data capacity. The system design of a given toll collection system using several RFID protocols may not be able to increase data capacity through the conventional methods of increases in data rates, using additional time per transaction, or other straightforward methods used by more expensive and power consuming wireless systems such as higher orders of modulation (such as 16 QAM or 64 QAM) of digital radio signals used in WiFi systems (radios complying to the standard IEEE 802.11).

Thus, there is a need for a way to increase channel data capacity in the uplink, downlink or both in an RFID system in such a way that normal operations are not affected when upgraded equipment is used in an existing system with legacy equipment. An updated tag is needed that can signal its ability to utilize an increased channel data capacity without disrupting normal communications with a non-upgraded reader, and an upgraded reader is needed that can communicate with non-upgraded as well as upgraded tags without disrupting normal communications. It is also desirable that use of the upgraded channel data capacity does not change the timing or bandwidth requirements of the system. The increased capabilities of the tags and readers are required to be economical and not increase power consumption or introduce other undesirable characteristics that would impede the growing widespread use of RFID systems.

As technology evolves, there is an increasing pressure for improvements. Increased security, improvements in channel data capacity, implementation of additional functions such as sensor inputs and the like are desired. However, establishing a new, or green field, application is difficult. Often, improvement is incremental and must be backward compatible with older equipment.

Increased security may use techniques of authentication of tags and/or readers. The authentication of tags prevents use of fraudulent, cloned, or otherwise non-genuine tags. The authentication of readers by tags prevents unauthorized access to tag functions and data. Authentication is becoming an increasing need for RFID systems as these systems become widespread. The authentication process involves encryption techniques and requires additional data to be transmitted between tag and reader. Many presently installed RFID systems have limits on the amount of data transmitted. If tags transmit additional data, upgraded readers can be designed to respond, but older readers not designed to handle additional data may fail and become confused with the additional data resulting in failures of the system to operate properly. For example, to add authentication to an existing tag protocol, some part of the transponder current response could be used to add authentication data. This would require changing some of the data that the transponder currently sends to the reader. This change in data would cause the reader to see this transponder as a new type of transponder. Because of this, currently installed readers would treat the new transponders differently from the old non-authenticated transponders, and the overall transaction performed by the reader would not be completed.

U.S. Pat. No. 4,075,632 teaches a method of encoding a slowly changing parameter, such as temperature, in the response of the tag as a change in the frequency of the data clock. The digital data stored in the memory of the tag is sent by the tag to a reader using modulated backscatter. A reader processes the signal to determine the digital information carried by the amplitude modulated backscattered signal and to extract the clock frequency thus recovering the value of the slowly varying parameter. However, the '632 secondary information signal has insufficient data capacity to convey an adequate amount of data in a limited time to provide the function of tag authentication discussed in the previous paragraph.

All references cited herein are incorporated herein by reference in their entireties.

BRIEF SUMMARY OF THE INVENTION

The present invention adds one or more secondary data channels to existing protocols to increase the channel data capacity of tags and readers in an RFID system. The secondary data channels may be added within the existing bandwidth, data clock rate and message frame times of existing protocols.

An RFID system having at least one reader and at least one tag includes communication between the reader and the tag using a radio frequency carrier signal modulated by a modulation signal to provide a modulated carrier signal conveying digital data in either direction. The modulation signal includes a first encoded modulation signal perturbed by encoded perturbations, the first encoded modulation signal being produced from a first data string. The encoded perturbations are produced from a second data string. The modulation signal modulates the radio frequency signals to transfer data representative of the first and second data strings simultaneously between the reader and the tag. The modulation signal modulates the amplitude, phase, frequency or any combination of the radio frequency carrier signals. The encoded perturbations may be produced from second and third data strings, and the modulation signal modulates the radio frequency signals to transfer data representative of the first, second and third strings simultaneously between the reader and the tag. The encoded perturbations may be produced from second, third and fourth data strings and the modulation signal modulates the radio frequency signals to transfer data representative of the first, second, third and fourth strings simultaneously between the reader and the tag. The encoded perturbations may not exceed predetermined signal tolerances with which the first encoded modulation signal must comply. The predetermined signal tolerances are tolerances on pulse timing, pulse width, clock frequency, rise time, fall time, signal jitter, signal level, modulation index or any combination.

An RFID system includes at least first and second readers and at least one tag, wherein the second reader and the tag communicate with each other using modulated radio frequency carrier signals to convey digital data in either direction between the second reader and the tag, wherein the radio frequency carrier signals are modulated by a modulation signal. The modulation signal includes a first encoded modulation signal perturbed by encoded perturbations, The first encoded modulation signal being produced from a first data string, the encoded perturbations being produced from a second data string, the modulation signal modulates the radio frequency signals to transfer data representative of the first and second data strings simultaneously between the second reader and the tag. The first reader is adapted to decode the first encoded modulation signal when the first encoded modulation signal is within predetermined signal tolerances, and the encoded perturbations do not cause the modulation signal to exceed the predetermined signal tolerances.

An RFID tag for operation with first and second readers wherein the second reader and the tag communicate with each other using modulated radio frequency carrier signals to convey digital data in either direction between the second reader and the tag, wherein the radio frequency carrier signals are modulated by a modulation signal. The modulation signal includes a first encoded modulation signal perturbed by encoded perturbations, the first encoded modulation signal being produced from a first data string, the encoded perturbations being produced from a second data string. The modulation signal modulating the radio frequency signals transfers data representative of the first and second data strings simultaneously between the second reader and the tag. The perturbations are limited to tolerances applicable to the first reader such that the first reader and the tag communicate with each other to transfer the data representative of the first data string.

Within an RFID system it can be useful to enable a secondary data channel with sufficient data capacity to enable improvements in functionality of tags which are compatible with unimproved tags and readers. The present invention adds data channel capacity to existing protocols while maintaining backward compatibility. The present invention also enables additional functional capability while maintaining backward compatibility. The present invention increases throughput while maintaining backward compatibility and adds data channel capacity and functionality while maintaining backward compatibility within the existing RF bandwidth. Furthermore, the present invention maintains the throughput of systems containing a mixed population of unimproved and improved tags (that is a method that does not involve serial polling or similar sharing mechanisms).

RFID communications protocols include specifications on the RF frequency, RF power, type of modulation, coding of data, and organization of data messages, commands and similar details. Modulation frequencies are specified in terms of a nominal design frequency and tolerances for allowable deviations. The present invention can achieve this by introducing secondary channels to the existing protocols.

The secondary data channel is added through secondary modulation formed by perturbing the modulation of existing protocols. The secondary data channels may be added within the existing specifications of signal modulation.

The added modulation can include modulation consisting of encoded perturbations of one or more of the following:
  edge position,
  pulse width,
  subcarrier frequency,
  pulse amplitude,
  or like elements of the protocol.

Backward compatibility can be accomplished if the encoded perturbations result in signals that remain within the tolerances of the specification of the primary existing protocol.

An unimproved reader may read standard data from an improved tag. The message may or may not indicate secondary channel capability to the reader. If the modulated signal is received by an improved reader, then the secondary channel can be utilized to pass extra data to and/or from an improved tag.

An improved reader can use a secondary data channel decoder to look for secondary channel data by processing the signal sent by a tag. If the improved reader reads an unimproved tag, the secondary data channel decoder will produce no data and the improved reader wastes no time attempting communication on the secondary channel thus maintaining throughput on the primary channel. If the improved reader reads an improved tag, the secondary channel decoder produces data thus increasing the data throughput and also allowing the improved reader and improved tag to conduct higher or improved functionality such as improved security through methods such a mutual authentication and/or real-time data encryption, conveying data from a sensor system attached to a tag, accessing additional memory in the tag, or similar functions not available in the unimproved RFID system.

The modulation for the secondary channel uses small changes or perturbations in the primary channel modulation in transmitted data to encode additional data sent by an RFID transponder while remaining compliant with the specifications for the primary channel modulation. The secondary data is in addition to the primary data that the transponder normally sends to the reader. In this way authentication information can be exchanged with an improved transponder without impacting performance of systems already installed. Since the changes in the primary modulation would be small, current systems would be able to decode the transponders normal data without any material impact to performance. A reader that supports the secondary modulation would be able to recover the normal transponder data as well as data encoded into the secondary modulation.

In the case of authentication data, the transponder ID or some other internal data may be processed using a proprietary algorithm and generate a unique authentication bit stream. That bit stream would be encoded into the secondary modulation in the transponder. The shift in the secondary modulation would be small enough to not materially degrade the performance of the original data, but would allow a properly equipped reader to decode the data encoded into the secondary modulation and recover the authentication bit stream. The reader could then compare the transponder ID or other internal data from the tag with the authentication bit stream to determine the authenticity of the transponder.

A novel aspect of the present invention is the ability to hide additional data in the current data stream from a transponder without materially impacting system performance. This will allow legacy or unimproved systems to operate without changes and without degradation of performance.

Secondary modulation is added to the primary modulation currently sent by an RFID transponder. The secondary modulation is added in a way to minimize the distortion of the primary data, so that it would not materially interfere with the decoding process for the primary data. The secondary data could be used to send additional data from the transponder to a reader. This secondary data could be used for several functions including:
  sending additional data,
  adding authentication,
  adding encryption information,
  additional check sum to improve reliability,
  hiding additional information in perturbations of the primary modulation.

DETAILED DESCRIPTION OF PREFERRED EMBODIMENTS OF THE INVENTION

Figure 5:
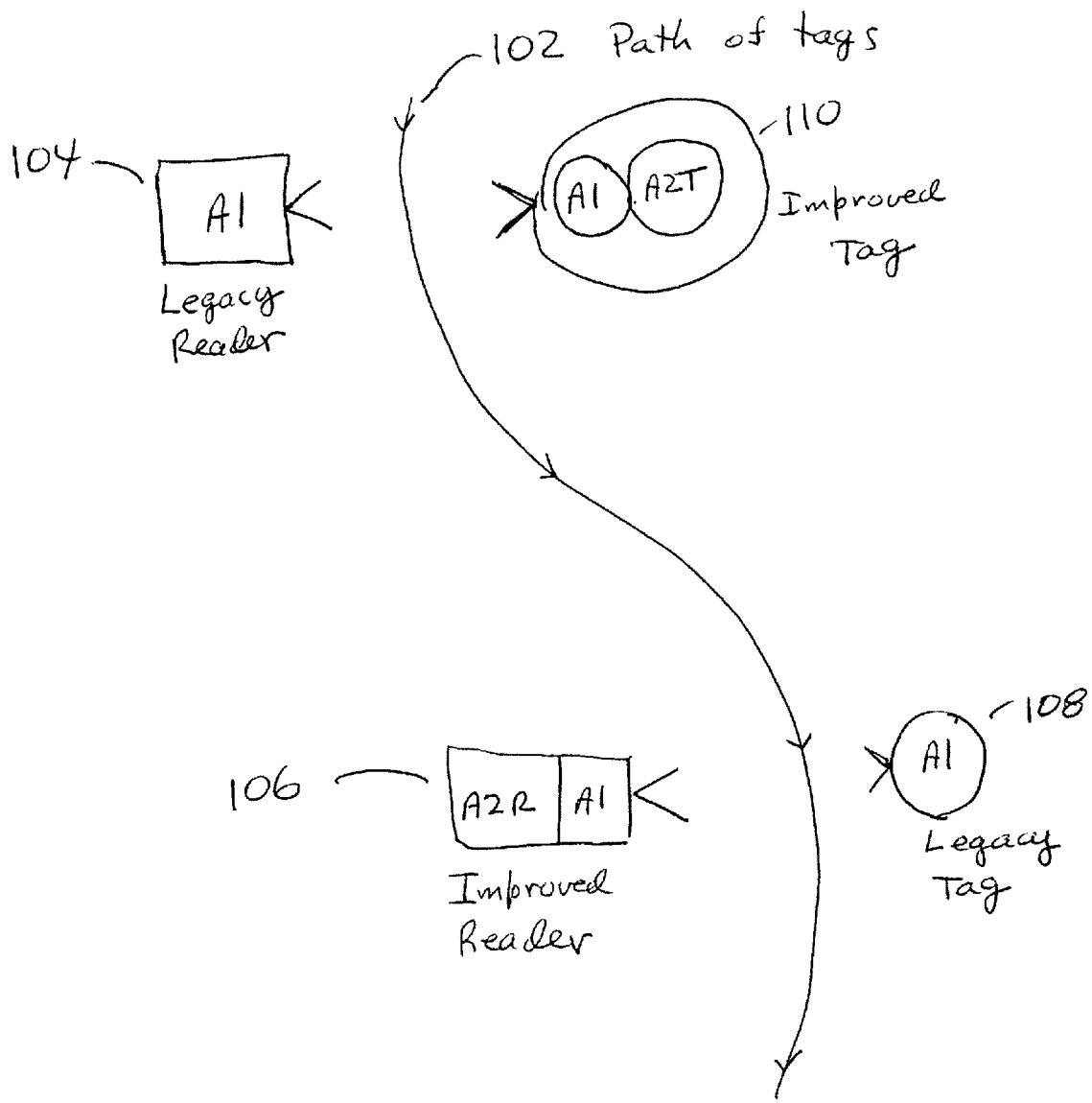
FIG. 5 shows a schematic of an implementation of tags and readers including unimproved legacy equipment as well as improved equipment.

An illustrative example of an application of an embodiment of the present invention is shown in FIG. 5. Many RFID applications, including electronic collection of tolls on toll roads, may use short range communications to conduct transactions between tags passing readers at stationary locations. The path 102 taken by tags passing readers is shown in FIG. 5.

Legacy, or unimproved, readers 104 are placed along the path 102 of the tags. Legacy, or unimproved, tags 108 conduct transactions with legacy readers 104 using the unimproved or legacy messaging protocol labeled A1.

An improved reader 106 implementing the present invention is located along the path of the tags. The improved reader includes a decoder A2R to decode secondary data transmitted by improved tag 110. As a legacy tag 108 passes improved reader 106, transactions can take place using the legacy protocol A1. Since the legacy tag 108 does not have the capability to encode secondary data, the improved reader 106 receives no data from its decoder of secondary data A2R and thus conducts transactions with legacy tag 108 using only protocol A1 and primary data, and recognizes that tag 108 is an unimproved legacy tag.

Improved tag 110 includes an encoder A2T of secondary data using the present invention to transmit secondary data to readers equipped with a decoder for secondary data. The improved tag 110 conducts legacy transactions with unimproved legacy readers 104 as tag 110 passes readers 104. Improved tag 110 may also send secondary data to reader 104. The legacy reader 104 does not have a decoder for decoding the secondary data encoded on top of the primary data of the present invention. However, it is able to receive the primary data.

When improved tag 110 reaches improved reader 106, the secondary data encoded on top of the primary data by improved tag 110 can be decoded by improved reader 106. Transactions between improved reader 106 and improved tag 110 may then use both primary and secondary data channels. Additional data capacity is enabled along with additional functionality such as the verification of tag authenticity.

Thus, legacy readers, improved readers, legacy tags and improved tags may all coexist and function in the RFID system. All readers can conduct transactions with all tags using the legacy protocol without any additional time or other increase in overhead. The operation of legacy tags and readers are unaffected by the use of the improved protocol by improved readers and improved tags within the RFID system. The timings of transactions using the unimproved legacy protocol are not affected by the addition of the secondary data channel of the improved protocol by using the present invention.

System specifications can include system parameters such as the radio frequency to be used, the modulation coding method, the data rate, and tolerances on the data rate, pulse widths, rise and fall times, and other similar parameters, so that equipment designed to the specifications will operate properly. In addition to the specification of the performance parameters, tolerances are also specified. For example, a specification of bit rate could be 250 kbps (kilobits per second) with a tolerance of +/−15% (that is from 212.5 kbps to 287.5 kbps). The tolerance on pulse width could be +/−7.5% of a bit period. The jitter of the pulse rising and falling edges including rise and fall times could be +/−5% of the bit rate. The deviation of the magnitude of the pulse amplitude could be +/−25%. These numbers are illustrative and do not limit the scope of the claims. Any given RFID system will have its unique set of specifications. Within these specifications, an encoded perturbation of the modulation of the signal within the specification may be designed to convey a secondary modulation. The technique is illustrated in the examples provided below. These examples are not limiting and are provided here only for illustration of some of the implementations of the methods of the present invention. Any modulation that remains within the specifications of the protocol will result in proper operation of legacy tags and readers.

Edge Shifted Encoding of Secondary Data

Figure 1:
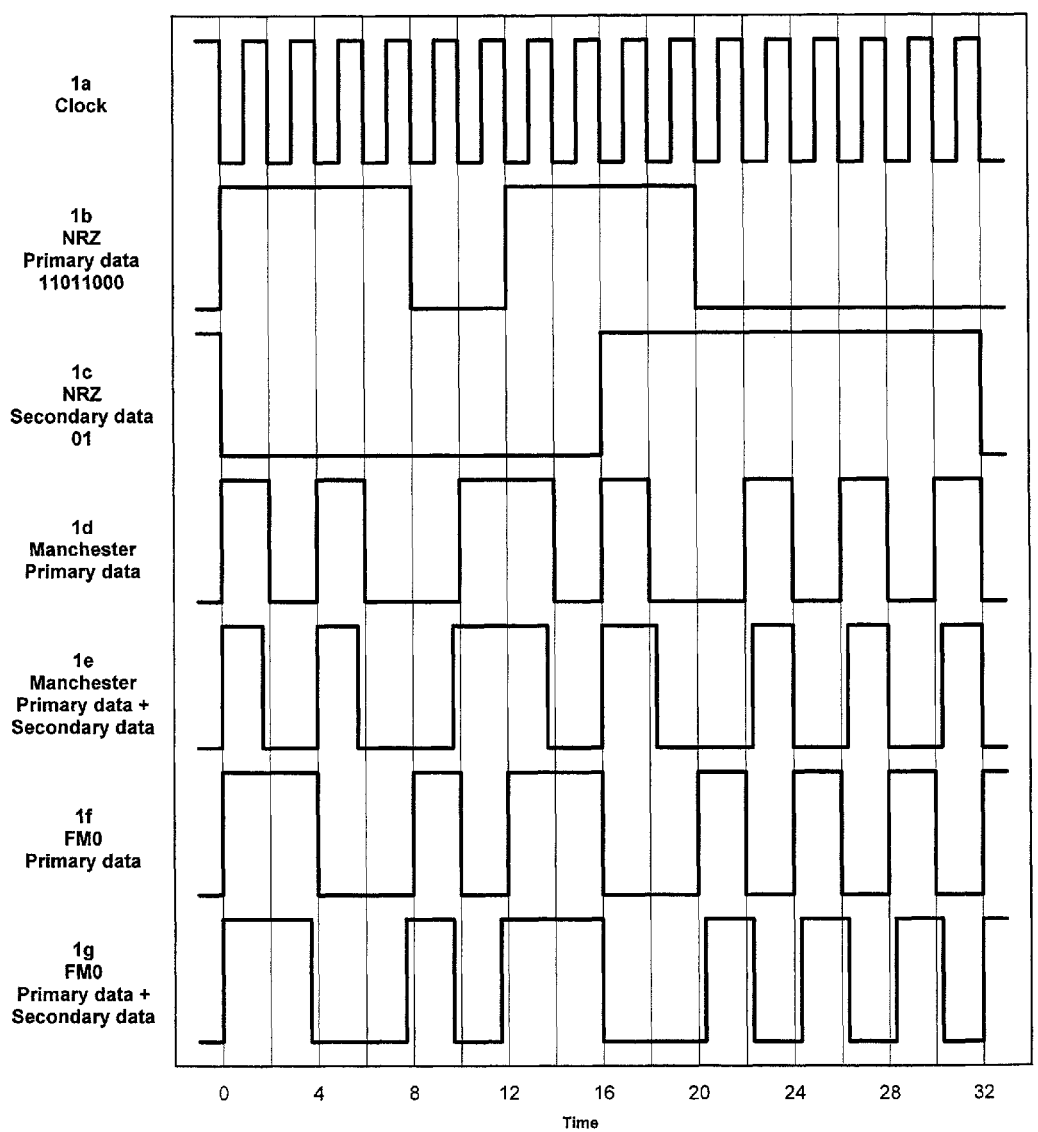
FIG. 1 shows exemplary modulation signals for encoding primary data with either Manchester or FM0 and the secondary data encoded with edge shift encoding.

Secondary modulation can be implemented by a shifting perturbation (retarding or advancing the timing of) the edges of the primary modulation by a small, controlled amount. FIG. 1 illustrates how the encoding could be implemented for Manchester and FM0 data. The same method could be used on any other type of data used in RFID systems. The methods developed for Edge Shift Encoding of secondary data may also be applied to any other methods, such as Duty Cycle Encoding and for FSK (frequency shift keying) Encoding. Some of the other methods where the invention can be applied are developed later and are not limiting but only used to illustrate the principles of the present invention and the methods may be applied to other encoding algorithms of the primary data.

FIG. 1a shows a clock signal with a clock rate of twice the bit rate of the primary data to be encoded and transmitted. The time scale is arbitrary. If the numbers on the time axis are interpreted as microseconds, the clock period is 2 microseconds, the clock rate is 500 kHz, the bit period of the primary data is 4 microseconds, the bit rate of the primary data is 250 kbps (kilo bits per second), the bit period of the secondary data is 16 microseconds, and the bit rate of the secondary data is 62.5 kbps. In all cases in FIG. 1 through FIG. 4, the primary data to be transmitted is the binary string '11011000'. FIG. 1b is the NRZ representation of the primary data. The secondary data to be transmitted is the binary string '01'. FIG. 1c is the NRZ representation of the secondary data. The bit rate of the secondary data is ¼ of the bit rate of the primary data in this example.

Since the secondary data is to be encoded in perturbations of the primary modulation and thus will have less energy than the primary data, a lower data rate improves the signal to noise ratio in practical systems for the secondary data. Data is encoded by Manchester encoding by using two states per bit. For a binary '1', the state of the first half of the bit period is high and the second half is low. For a binary '0', the state of the first half of the bit period is low and the state of the second half of the bit period is high. The data string '11011000' is shown encoded by Manchester encoding in FIG. 1d. This is the signal to be used in an unimproved legacy system without the improvement of the secondary data channel of the present invention.

FIG. 1e shows the modulation waveform resulting from perturbing the primary data waveform by adding the secondary channel data to the primary data waveform of FIG. 1d. In this case, the algorithm perturbs the timing of the transition at the middle of a Manchester bit by advancing it a predetermined amount of time, for example by 7.5% of the bit period, if the secondary data is a '0.' Thus, in this example, the transitions in FIG. 1d are advanced in FIG. 1e at the times of 2, 6, 10, and 14 time units. Additionally, the timing of the transition at the middle of a Manchester bit can be perturbed by delaying it a predetermined amount of time, for example by 7.5% of the bit period, if the secondary data is a '1.' Thus, in this example, the transitions in FIG. 1d are retarded in FIG. 1e at times of 18, 22, 26, and 30 time units. To recover the primary data, a receiver processes the encoded data normally since the modulated signal is within the specifications of a Manchester encoded data string. This process may include extraction of the data clock shown in FIG. 1a. The Manchester encoded primary data is extracted resulting in the NRZ representation of the primary data shown in FIG. 1b. The expected Manchester waveform can be reconstructed to produce the waveform of FIG. 1d in the receiver. The secondary channel data processor then can compare the actual received waveform shown in FIG. 1e to the reconstructed, or recovered, Manchester waveform of FIG. 1d and determine whether the edges of the signal transitions at the center of the bits are advanced or retarded, thus extracting the secondary data.

The secondary data could use several Manchester bit periods per secondary bit. In this example each secondary bit takes 4 Manchester bit periods to encode the data. This is required since the edge is shifting only a small percentage of the Manchester bit period time, and it would take several Manchester bit periods to encode a single edge shifted bit. The actual number of Manchester bit periods required will depend on factors such as the signal-to-noise ratio (SNR), the total percent of the bit period the edge can shift, the required performance of the edge shifted data, and the performance of the edge shifted decoder. In this example the only edge that is shifted is the center transition in the Manchester data. The signal transitions or edges that define the beginning and ending points of each Manchester bit are not shifted. The intent of this is to allow the decoder to use the Manchester bit beginning and ending points as a timing reference. However, those skilled in the art will understand that other edges in the Manchester encoding can be shifted in accordance with the method of the invention. FIG. 1e illustrates the resulting edge modulated Manchester modulation signals that contain the primary as well as the secondary encoded data, according to the present invention.

The modulation waveform shown in FIG. 1e can be used to modulate the RF (radio frequency) carrier signal in the RFID system. Typically, amplitude modulation is used for the devices (readers and/or tags) that have an RF transmitter. Modulation indexes from 18% to 100% are typical. The details of the modulation of the RF carrier are outlined here for illustrative purposes and are not limiting. For example, phase or frequency modulation could also be used. The modulation waveforms shown in FIG. 1 may also be used by a device (usually a tag) that uses the technique of modulated backscatter to transmit data from the tag to the reader. In this case, the modulation waveforms of FIG. 1 are used to modulate the amplitude and/or the phase of the signal reflected by the tag back to the reader. The tag can use many methods of performing modulated backscatter including, but not limited, to modulating the impedance (real, reactive, or a combination) of load attached to the antenna of the tag, receiving the interrogation signal from the reader and using the modulation waveform to control a switch that controls retransmission of the signal back to the reader through the same antenna that was used to receive the signal or a separate antenna or antennas, creating sidebands (single, double, suppressed carrier, etc.) controlled by the modulation signals of FIG. 1, and the like.

Manchester encoding must always have a level transition at or near the middle of the bit: from high to low to encode a binary '1' and a transition from low to high to encode a binary '0'. Level transitions may or may not occur at bit boundaries depending on the content of the binary data. For the example of FIG. 1, the first two primary bits in the data to be encoded are '11' (one, one). In this case, a level transition occurs at the bit boundary between the first and second bit. The third bit is a binary '0'. In this case, the binary string '10' results in no level transition at the bit boundary (between the second and third bit in this example). The example of secondary data encoding using edge shift modulation of Manchester encoded primary data chose to perturb only the timing of the transition at the center of each bit since there is always a transition at the center of a Manchester bit. The example chose to not perturb the timing of bit boundaries between adjacent Manchester bits.

In addition to Manchester encoding of primary data, other encoding methods may be used to implement the present invention. FIG. 1f and FIG. 1g illustrate edge shift encoding of secondary data for FM0 encoded primary data. FM0 is also known as Bi-Phase Space. FM0 encoding includes data transitions at all bit boundaries. In addition, a data transition occurs at the center of the bit if a logical 0 is sent and no transition occurs at the center of the bit if a logical 1 is sent. Transitions may be either from high to low or from low to high as dictated by the data to be encoded. FIG. 1f shows the modulated waveform using FM0 encoding on the primary data string '11011000'. The encoding algorithm for secondary data used for Manchester encoding of primary data is not optimum for FM0 since long time periods may occur (depending of the data to be encoded) where there are no level transitions of the FM0 encoded signal at the center of the bit periods of the primary bits. This situation occurs for the binary data strings '11' which will be common in typical strings of primary data. Thus, implementing edge shift encoding by advancing or retarding the transition at the center of bits encoded with FM0 will have diminished energy, and in case of a long string of '1's, there will be no edges to perturb.

Thus, to implement one preferred embodiment of the present invention, the transitions at primary data bit boundaries can be modulated or perturbed (retarded or advanced). However, at the edges of the secondary data bit boundaries, if the timing of the secondary bits is synchronized with the primary bits (as shown in FIG. 1c), an ambiguity may arise at the boundaries between secondary bits (for binary bits streams of '10' or '01' of the secondary data). This dilemma could be solved by delaying the timing of the secondary bits by half a period of the primary bits. However, an alternate solution can be chosen for the example in FIG. 1. An alternative encoding algorithm for encoding secondary data on top of FM0 encoded primary data of FIG. 1f is shown in FIG. 1g. The algorithm is to not perturb the timing of transitions at the bit boundaries of the secondary data, and perturb the timings of all other transitions, either by advancing if the secondary data bit is a binary '1', or retarding if the secondary data bit is a binary '0'. The resulting modulation signal is shown in FIG. 1g. Thus in this example, the transitions in FIG. 1f are advanced in FIG. 1g at the times of 4, 8, 10, and 12 time units; and are retarded at the times of 20, 22, 24, 26, 28, and 30 time units.

Thus, a plurality of examples of Edge Shift Encoding of secondary data has been provided and illustrated in connection with FIG. 1. These examples are illustrative of ways to implement preferred embodiments of the present invention and are not limiting. The principles of the present invention may be applied to other modulation encoding methods.

Duty Cycle Encoding of Secondary Data

Figure 2:
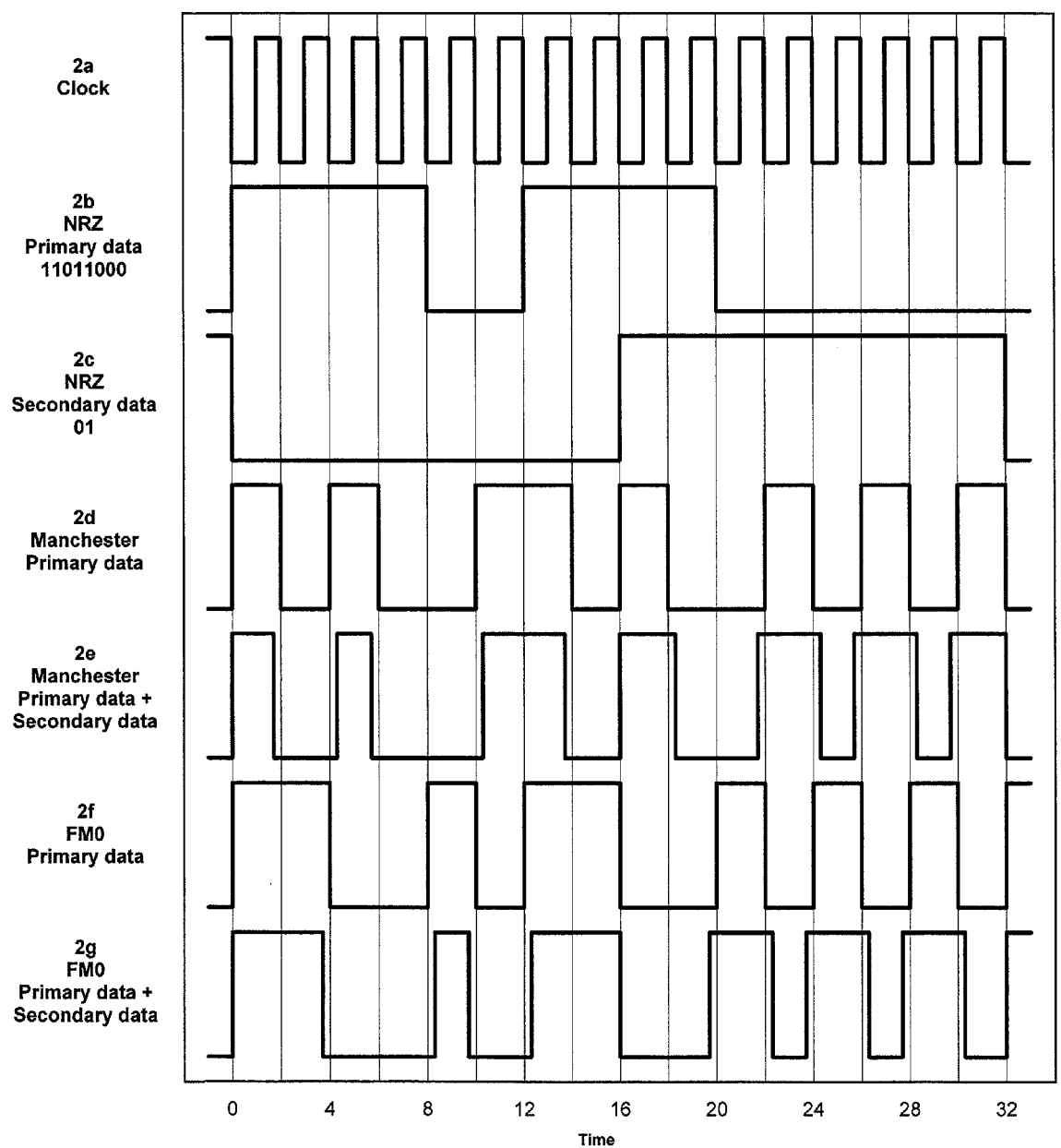
FIG. 2 shows exemplary modulation signals for encoding primary data with either Manchester or FM0 and the secondary data encoded with duty cycle encoding.

FIG. 2 shows an embodiment of the invention in which the a primary data string (for example the primary data string '11011000' used above) can be encoded with the secondary data string '01' by varying, or perturbing, the duty cycle of the Manchester data. FIG. 2a is the data clock signal, FIG. 2b is the NRZ representation of the primary data, FIG. 2c is the NRZ representation of the secondary data, and FIG. 2d is the Manchester encoded primary data. In this example four primary Manchester bit periods are used for each Duty Cycle Encoded secondary data bit. Many of the principles of Edge Shift Encoding taught above apply to Duty Cycle Encoding.

To modulate the duty cycle with secondary data, an illustrative example of an algorithm is to consider the signal resulting from encoding the primary data as a series of pulses. The width of the 'positive' or high pulses is reduced and the width of the 'negative' or low pulses is increased if the secondary data is a binary '0', and the width of the 'positive' or high pulses is increased and the width of the 'negative' or low pulses is reduced if the secondary data is a binary '1', as shown in FIG. 2e for Manchester encoded primary data. The pulse width, or duty cycle, is perturbed by retarding or advancing the timings of signal transitions. Timings of signal transitions are not adjusted (neither advanced nor retarded) at the boundaries of the secondary bits. Thus, in this example, the signal transitions of FIG. 2d are advanced in FIG. 2e at the times of 2, 6, 14, 22, 26, and 30 time units; and are retarded at the times of 4, 10, 18, 24, and 28 time units. This embodiment has the advantage of being able to decode the duty cycle encoded secondary data bits using the Manchester timing as a reference and using the average DC value of the modulation signal to decode the secondary data bits. The algorithm may also be used on other forms of encoding the primary data. FIG. 2g illustrates the Duty Cycle Encoding of secondary data for a signal constructed with FM0 encoding of the primary data of FIG. 2f. For this example, the signal transitions of FIG. 2f are advanced in FIG. 2g at the times of 4, 10, 20, 24, and 28 time units and are retarded at the times of 8, 12, 22, 26, and 30 time units.

The signal returned by a tag to a reader using modulated backscatter is usually detected (modulated RF converted to baseband) using a homodyne receiver. A homodyne receiver mixes the signal (or a portion of the signal) transmitted by the reader with the reflected signal. The polarity of the detected signal depends on the difference in phase between the radio frequency signal transmitted by the reader and the radio frequency signal reflected by the tag and received by the reader. The phase difference is influenced by the distance between the reader antenna and the tag antenna. This receiving process can cause the detected signal to reverse polarity. Thus, it is not straightforward to decipher the secondary data from the signal received from a backscattered tag that is using Duty Cycle Encoding of secondary data. Several methods can be used to solve this problem including using check sums in the data, starting a message with a preamble of known data, or other such methods to determine which polarity of the detected signal is the correct signal. Encoding of primary data using edge timings or frequency (such as FSK or FM0) is preferred for systems using modulated backscatter tags. Manchester encoding of modulated backscatter signals is also problematic since the detected signal can change polarity and the Manchester data is encoded with polarity. These practical details may influence the design of the encoding algorithms, decoding, and data processing used to recover the primary and secondary data, but the techniques taught here may be used.

FSK Encoding of Secondary Data

Figure 3:
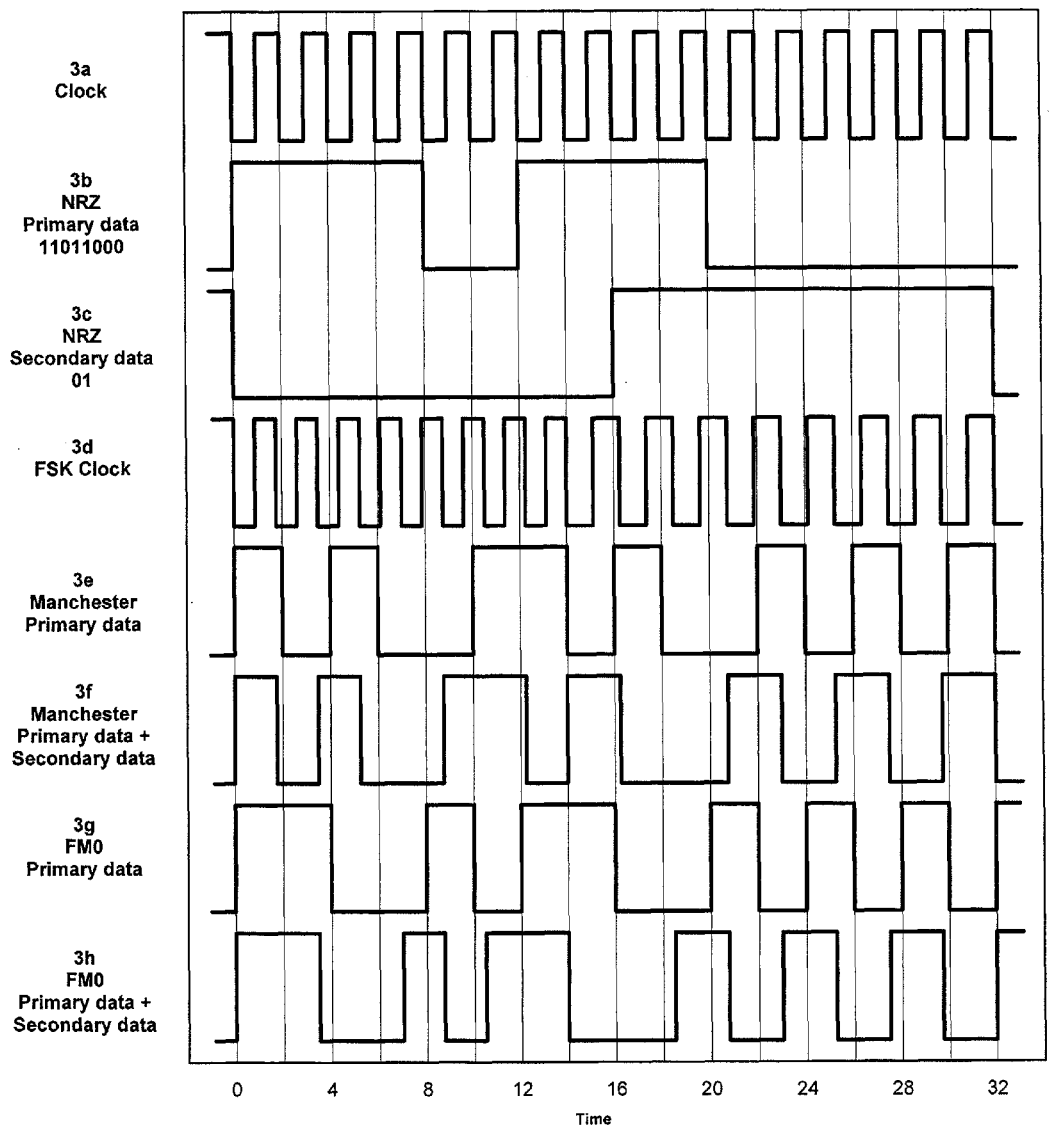
FIG. 3 shows exemplary modulation signals for encoding primary data with either Manchester or FM0 and the secondary data encoded with FSK encoding.

FIG. 3 shows FSK (frequency shift keying) to encode secondary data on a signal resulting from Manchester or FM0 encoded primary data. In this embodiment of the invention each secondary bit can take four primary data bit periods to encode the data since the frequency shift may be only a small percentage of the primary data bit rate, and it could take several primary data bit periods to decode a single frequency shifted secondary bit. The actual number of primary data bit periods required will depend on factors such as the SNR, the total percent of the frequency shift, the required performance of the secondary modulation data, and the performance of the FSK decoder. This method has the advantage of being able to decode the FSK encoded secondary data using the primary data bits as a timing reference and measuring the time required for 4 primary data bits, or using a PLL to lock to the primary data.

Similar to FIGS. 1 and 2, FIG. 3a shows a constant frequency data clock signal, FIG. 3b shows the primary data binary bit string '11011000' encoded as NRZ, and FIG. 3c shows the secondary data binary bit string '01' encoded as NRZ. The Edge Shift or Duty Cycle encoding methods for the secondary data can be considered to alter the timings of transitions after the encoding of the primary data. In contrast, the FSK Encoding of secondary data can be thought of as controlling the primary clock frequency with the secondary data bits forming a FSK clock as shown in FIG. 3d, and then performing the normal encoding of the primary data (such as using Manchester, FM0, or other). FIG. 3e is the Manchester encoded primary data using the constant clock of FIG. 3a, and FIG. 3f is the Manchester encoded primary data using the FSK clock of FIG. 3b. FIG. 3g is the FM0 encoded primary data using the constant clock of FIG. 3a, and FIG. 3f is the FM0 encoded primary data using the FSK clock of FIG. 3b. The signal used to modulate the RF carrier with both the primary and secondary data are the signals of FIG. 3f for Manchester encoding and FIG. 3h for FM0 encoding. At the receiver (either in the reader or tag as is appropriate), decoding both primary and secondary data may involve the steps of recovering the data clock on a bit by bit manner, decoding the primary data normally, and decoding the secondary data independently of the details of the coding of the primary data except for the clock rate by assigning a secondary data bit value '0' to the higher clock frequency and a secondary data bit value '1' to the lower clock frequency.

Amplitude Encoding of Secondary Data

Secondary data may also be encoded into the amplitude of the encoded primary data signal. For example, a two-level amplitude modulation encoding may be used. When the data in the secondary channel is low, the modulation of the data encoded by the data in the primary channel can be reduced by some amount, for example 20%. When the data in the secondary channel is high, the modulation of the data encoded by the data in the primary channel can be increased, for example by 20%. With proper design, the level of modulation can be designed to remain within the specifications for the base system and can be recovered by an improved receiver.

Combinational Encoding of Secondary Data

A plurality of secondary data streams can be encoded simultaneously using any combination or combinations of the embodiments presented here. For example, in addition to the encoding of the primary data, a first secondary data stream A could be encoded through FSK Encoding of FIG. 3 and then in addition a second secondary data stream B could be encoded with Edge Shift Encoding of FIG. 1. Such an implementation would operate with three independent data channels. These additions add complexity to the encoders and decoders, but retain the capability of a legacy (non-secondary channel capable equipment) readers and/or tags to operate properly without degradation for the primary data channel.

Figure 4:
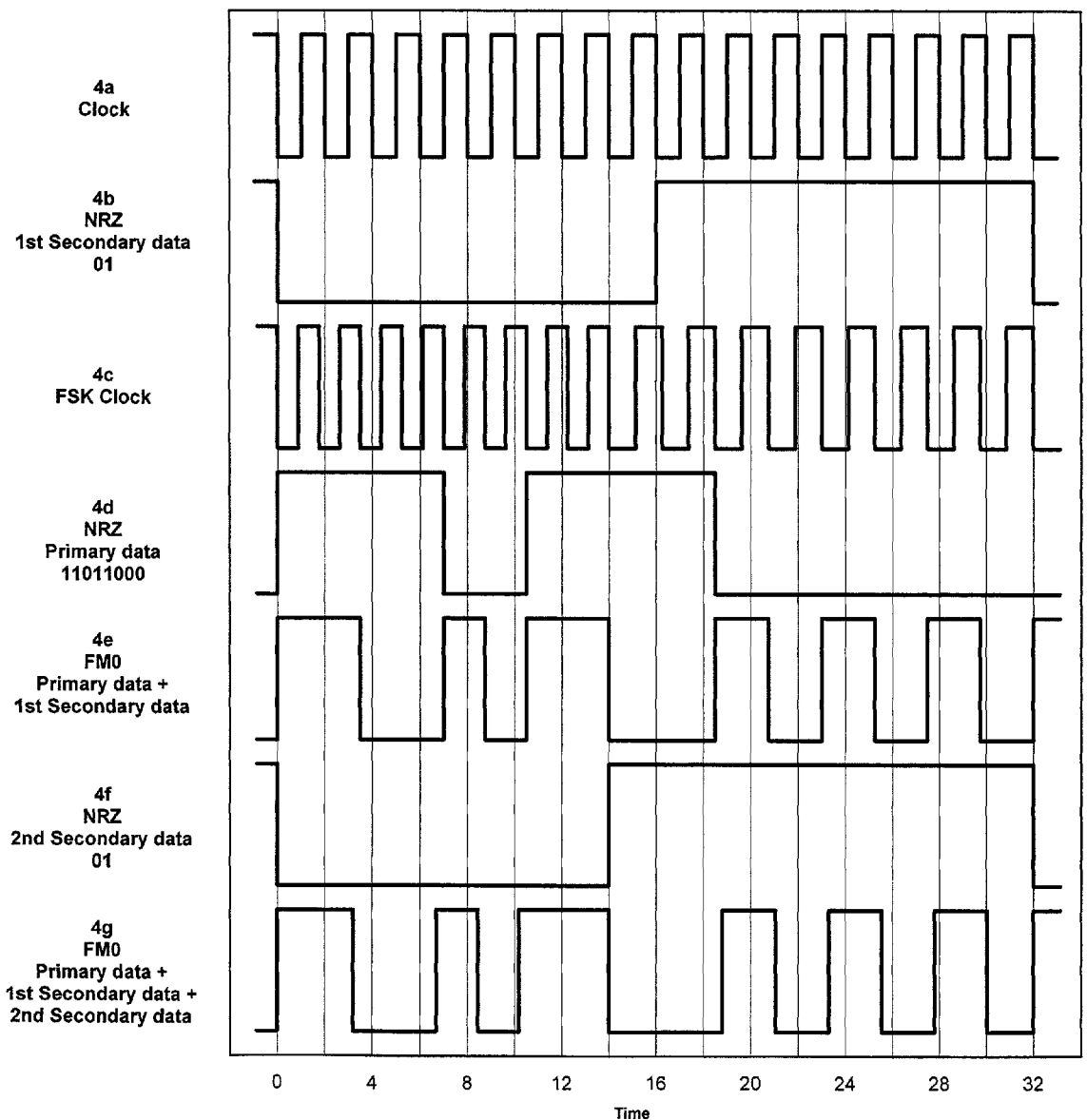
FIG. 4 shows exemplary modulation signals for encoding primary data with FM0, a first secondary data encoded with FSK encoding, and a second secondary data with edge shift encoding.

FIG. 4 shows the waveforms for the example provided above. FIG. 4a is the constant frequency primary data clock signal. The data of the first secondary channel ('01') is shown in the NRZ signal of FIG. 4b. Modifying the primary clock with the techniques of FSK, the primary clock is controlled to run faster during the times that the first secondary channel data is low, and run slower during the times that the first secondary channel data is high as shown in FIG. 4c. The primary data ('11011000') is shown as NRZ in FIG. 4d using the timing provided by the FSK clock. The resulting FM0 encoding is shown in FIG. 4e. In this example, the result, shown in FIG. 4e, is the same as that shown in FIG. 3h. The data of the second secondary channel ('01') is shown in the NRZ signal of FIG. 4f. The signal of FIG. 4e is then encoded by the data of the second secondary channel shown in FIG. 4f with the technique of Edge Shift Encoding resulting in the final signal shown in FIG. 4g. When the signal of FIG. 4g is received, all three channels of data can be recovered, that is the primary data, the first secondary data and the second secondary data. For example, the data of the primary channel can be extracted from the signal of FIG. 4g by comparing pulse widths and applying the FM0 encoding in reverse. The bit boundaries can then be deduced. The data in the first secondary channel can be recovered by reversing the FSK coding. The signal of FIG. 4e can then be reconstructed in the remote receiver and compared to the actual received signal of FIG. 4g and the data in the second secondary channel recovered by reversing the Edge Shift Encoding.

Additional Combinational Encoding of Secondary Data

A third level of secondary data encoding could be applied to the modulation signal of FIG. 4g using amplitude modulation techniques.

The illustrative examples of several embodiments of the present invention have used the bit stream '11011000' for the primary data, '01' for the secondary (or first secondary) data bit stream, and '01' for the second secondary data bit stream.

These specific bit streams are illustrative. Any bit streams can be used with the present invention, both in length of the bit streams and sequence of data.

Those skilled in the art will recognize other detailed designs and methods that can be developed employing the teachings of the present invention. The examples provided here are illustrative and do not limit the scope of the invention, which is defined by the attached claims. For example, disclosure with respect to waveforms for encoding or representing data can apply equally well to the inverses of the waveforms used as examples.

What is claimed is:

1. An RFID system having at least one reader and at least one tag, comprising:
communication between said reader and said tag using a radio frequency carrier signal amplitude modulated by a modulation signal to provide a modulated carrier signal conveying digital data in either direction,
said modulation signal comprising a first encoded modulation signal perturbed by encoded perturbations,
said first encoded modulation signal being produced from a bit encoded first data string, having bit encoding timing,
said encoded perturbations being produced from a second data string and modifying said bit encoding timing, and
said modulation signal modulating the radio frequency carrier signals to transfer data representative of said first and second data strings simultaneously between said reader and said tag.

2. The RFID system of claim 1, wherein said encoded perturbations are produced from second and third data strings and said modulation signal modulates the radio frequency signals to transfer data representative of said first, second and third strings simultaneously between said reader and said tag.

3. The RFID system of claim 1, wherein said encoded perturbations are produced from second, third and fourth data strings and said modulation signal modulates the radio frequency signals to transfer data representative of said first, second, third and fourth strings simultaneously between said reader and said tag.

4. The RFID system of claim 1, wherein said encoded perturbations do not exceed predetermined signal tolerances with which said first encoded modulation signal must comply.

5. The RFID system of claim 4, wherein said predetermined signal tolerances are tolerances on pulse timing, pulse width, clock frequency, rise time, fall time, signal jitter, or any combination.

6. The RFID system of claim 2, wherein said encoded perturbations do not exceed predetermined signal tolerances with which said first encoded modulation signal must comply.

7. The RFID system of claim 6, wherein said predetermined signal tolerances are tolerances on pulse timing, pulse width, clock frequency, rise time, fall time, signal jitter, or any combination.

8. The RFID system of claim 3, wherein said encoded perturbations do not exceed predetermined signal tolerances with which said first encoded modulation signal must comply.

9. The RFID system of claim 8, wherein said predetermined signal tolerances are tolerances on pulse timing, pulse width, clock frequency, rise time, fall time, signal jitter, or any combination.

10. An RFID system, comprising:
at least first and second readers and at least one tag,
wherein said second reader and said tag communicate with each other using amplitude modulated radio frequency carrier signals to convey digital data in either direction between said second reader and said tag,
wherein the radio frequency carrier signals are modulated by a modulation signal
said modulation signal comprising a first encoded modulation signal perturbed by encoded perturbations,
said first encoded modulation signal being produced from a bit encoded first data string having bit encoding timing,
said encoded perturbations being produced from a second data string and modifying said bit encoding timing,
said modulation signal modulating the radio frequency signals to transfer data representative of said first and second data strings simultaneously between said second reader and said tag,
said first reader is adapted to decode said first encoded modulation signal when said first encoded modulation signal is within predetermined signal tolerances, and
said encoded perturbations do not cause said modulation signal to exceed said predetermined signal tolerances.

11. An RFID tag for operation with first and second readers,
wherein
the second reader and said tag communicate with each other using amplitude modulated radio frequency carrier signals to convey digital data in either direction between the second reader and said tag,
wherein
the radio frequency carrier signals are modulated by a modulation signal said modulation signal comprising a first encoded modulation signal perturbed by encoded perturbations,
said first encoded modulation signal being produced from a bit encoded first data string having bit encoding timing,
said encoded perturbations being produced from a second data string and modifying said bit encoding timing,
said modulation signal modulating the radio frequency signals to transfer data representative of said first and second data strings simultaneously between the second reader and said tag,
said perturbations are limited to tolerances applicable to the first reader such that the first reader and said tag communicate with each other to transfer said data representative of said first data string.

12. An RFID communication method for use in an RFID system having at least one reader and at least one tag, comprising:
amplitude modulating a radio frequency carrier signal with primary data to provide a primary modulated signal having primary data bits wherein a primary data bit has a primary bit transition,
applying a perturbation to the primary bit transition timing in accordance with a secondary data bit to provide a secondary modulated signal;
transmitting the secondary modulated signal between the reader and the tag to provide a transmitted signal,
receiving the transmitted signal to provide a received signal,
decoding the received signal to determine a reconstructed primary modulated signal;
comparing the received signal and the reconstructed primary modulated signal to determine the perturbation and provide a determined perturbation; and
determining the secondary data bit in accordance with the determined perturbation.

13. The RFID communication method of claim 12, wherein applying the perturbation further comprises selectively advancing or delaying the primary bit transition in accordance with the secondary data bit to provide a secondary bit transition.

14. The RFID communication method of claim 13, further comprising advancing the timing of the primary bit transition if the secondary data bit has a value of zero.

15. The RFID communication method of claim 13, wherein comparing the received signal and the reconstructed primary modulated signal further comprises comparing the primary bit transition and the secondary bit transition.

16. The RFID communication method of claim 13, wherein the primary bit transition occurs within a predetermined tolerance of a boundary between adjacent primary data bits.

17. The RFID communication method of claim 13, wherein the selected bit transition occurs within a predetermined tolerance of the middle of the primary data bit.

18. The RFID communication method of claim 12, wherein the RFID system includes first and second readers, the first reader having a single channel for decoding only the primary data bit and the second reader having a primary channel for decoding the primary data bit and a secondary channel for decoding the secondary data bit.

19. The RFID communication method of claim 12, further comprising:
    applying a further perturbation to a primary data bit in accordance with a tertiary data bit to provide a tertiary modulated signal;
    comparing the received signal and the reconstructed primary modulated signal to determine the further perturbation and provide a further determined perturbation; and
    determining the tertiary data bit in accordance with the further determined perturbation.

20. The RFID communication method of claim 12, wherein the primary data bit has a primary bit duty cycle and applying the perturbation to the primary bit transition timing comprises altering the primary bit duty cycle.

21. The RFID communication method of claim 20, wherein the primary data bit has two primary bit transitions and altering the primary bit duty cycle comprises perturbing timing of both primary bit transitions.

22. An RFID communication method for use in an RFID system having at least one reader and at least one tag, comprising:
    amplitude modulating a radio frequency carrier signal with primary data to provide a primary modulated signal having primary data bits wherein a primary data bit has a primary bit duty cycle,
    applying a perturbation to the primary bit duty cycle in accordance with a secondary data bit to provide a secondary modulated signal;
    transmitting the secondary modulated signal to provide a transmitted signal,
    receiving the transmitted signal to provide a received signal,
    decoding the received signal to determine a reconstructed primary modulated signal;
    comparing the received signal and the reconstructed primary modulated signal to determine the perturbation and provide a determined perturbation; and
    determining the secondary data bit in accordance with the determined perturbation.

* * * * *